United States Patent

Hightower et al.

Patent Number: 5,233,806
Date of Patent: Aug. 10, 1993

[54] ARTICULATING STONE EDGING CONSTRUCTION

[76] Inventors: Keith P. Hightower, 2043 River Rd., Shreveport, La. 71105; Thomas S. Pernici, 6014 River Rd. Cir., Shreveport, La. 71103

[21] Appl. No.: 807,145

[22] Filed: Dec. 13, 1991

[51] Int. Cl.$^5$ ............................................. E04B 1/02
[52] U.S. Cl. ........................................ 52/561; 52/606
[58] Field of Search .............. 52/561, 562, 564, 565, 52/568, 585, 604, 605, 606, 102; 47/33; 405/284

[56] References Cited

U.S. PATENT DOCUMENTS 2,826,900  3/1958  Rice ................................. 52/606 X
3,545,128  12/1970  La Fontaine et al. ............ 52/585 X Primary Examiner—Carl D. Friedman
Assistant Examiner—Creighton Smith
Attorney, Agent, or Firm—John M. Harrison

[57] ABSTRACT

An articulating stone edging construction for bordering flower beds, sidewalks, driveways and the like, which construction includes top and bottom layers of ornamental stones joined in staggered, articulating relationship to assume any desired configuration. In a preferred embodiment the bottom stones are fitted with a pair of spaced openings and a centrally located, downwardly-extending anchor pin for securing the stone edging in a selected position. The top stones are provided with spaced, downwardly-extending tie wires which project through the openings in the bottom stones and are twisted around the anchor pins to secure the top stones to the bottom stones in articulating relationship.

18 Claims, 1 Drawing Sheet

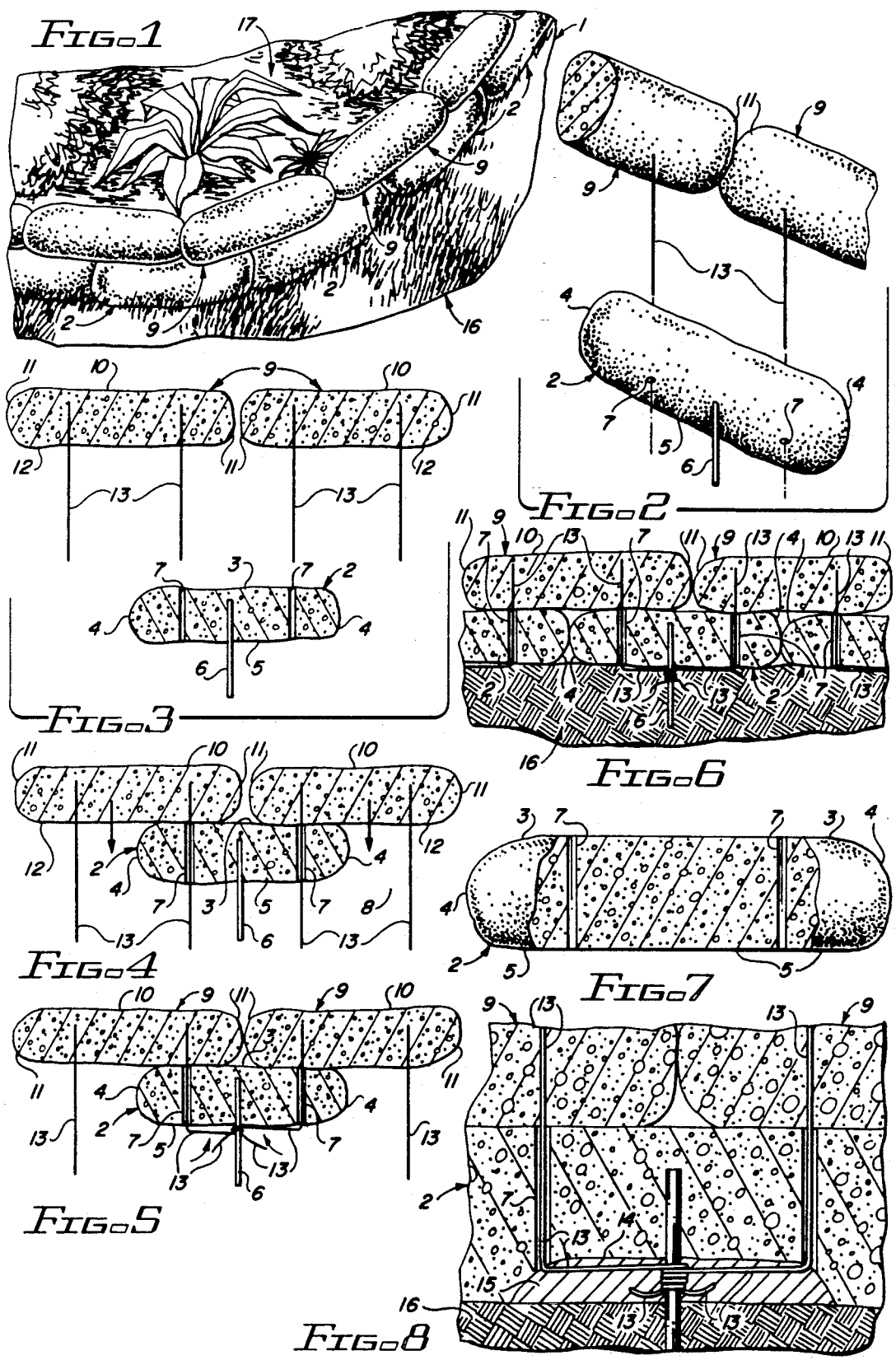

ARTICULATING STONE EDGING CONSTRUCTION

BACKGROUND OF THE INVENTION

1. Field of the Invention

This invention relates to edging for flower beds, driveways, sidewalks and the like and more particularly, to an articulating stone edging construction characterized by a stacked row of ornamental stones joined in end-to-end and offset, or staggered, articulating relationship. In a preferred embodiment of the invention the articulating stone edging construction includes two rows of stacked stone edging wherein the stones are rounded at the ends and the bottom layer of stones is fitted with a pair of spaced, vertically transverse openings and a centrally located, downwardly-extending anchor pin for penetrating the ground. Each stone in the top layer of ornamental stones is provided with a pair of spaced, downwardly-extending tie wires which project through the openings in adjacent ones of the bottom stones and are secured to the anchor pins, respectively. In another preferred embodiment of the invention the bottom stones are each fitted with a cavity which surrounds the downwardly-extending anchor pins, for receiving the twisted ends of the tie wires and the cavity is filled with a concrete or an epoxy material to cover the tie wire-anchor pin interface. In a most preferred embodiment of the invention, four top stones are joined to four bottom stones in staggered, articulating relationship as described above, to form a stone edging strip and multiple stone edging strips are then joined in the same manner to complete a desired length of stone edging.

Gardening and landscaping have long been a major part of both residential and commercial construction. One of the major elements in a landscaping plan for either residential or commercial structures is the edging material used to border flower beds, driveways, trees, shrubs, sidewalks and like areas of the property. This edging is usually decorative and typically ranges from molded plastic edging or metal sheets maintained in position by corresponding metal stakes, to bricks, rocks, landscape posts embedded in the ground and like bordering material. One of the problems which is inherent in selecting a suitable bordering material for a specific landscaping application is the attractiveness, flexibility and applicability of the material to the various shapes presented by flower beds, trees, shrubs, driveways, walkways and like amenities. While the common black molded plastic edging material is useful due to its resiliency and the capability of molding to substantially any configuration, the attractiveness factor is quite low with regard to this material. Furthermore, while brick is a popular bordering material, application of individual bricks to a large flower bed, driveway or the like, becomes time consuming, costly and the finished product requires considerable maintenance, since the individual bricks may become easily dislodged from originally installed positions.

2. Description of the Prior Art

Various bordering blocks, stones and other material which are connected in repetitive fashion are known in the art. An early "Dividing Stone For Gardens or Lawns" is detailed in U.S. Pat. No. 1,813,055, dated Jul. 7, 1931, to G. P. Kannen. The patent details an artificial stone which is adapted to be oriented in a variety of contours by connecting the stones together using a flexible metal band or bar. U.S. Pat. No. 2,865,136, dated Dec. 23, 1958, to H. R. Scott, et al, details a "Border Block", which is capable of interlocking with adjacent border blocks and is fitted with a U-shaped mounting member having downwardly-extending, spaced legs for securing the border blocks in sequence to the ground. U.S. Pat. No. 2,912,792, dated Nov. 17, 1959, to E. G. Venable, details an "Ornamental Curb" which simulates brick or stone arranged in a manner that permits easy removal. The curb may be fashioned from molded plastic and constructed in specified lengths which interlock to form a selected edging. U.S. Pat. No. 3,780,484, dated Dec. 25, 1973, to George B. Muse, is entitled "Universal Blocks". The patent details a wall structure and blocks forming the wall structure, which blocks are generally rectangular and divided along their length into four substantially equal parts, with a vertical hole centrally positioned through each of the four parts. Each of the four parts also has an alignment groove, such that when the two overlying blocks and adjacent courses of blocks overlie by any number of one-fourth of the length of a block, at least some of the alignment grooves and vertical holes will be vertically aligned. Expandible aligning rods are adapted to fit within the aligned grooves and may extend through several courses of blocks to assure vertical alignment of multiple blocks. A "Building Block and Wall Construction" is detailed in U.S. Pat. No. 4,040,225, dated Aug. 9, 1977, to S. W. Bretone. Each building block includes multiple pins which are arranged in two rows of unequal length, with each row projecting from a common surface in a plane perpendicular to the surface and a recess channel on a surface opposite to the first surface, in alignment with the longer row, and having a depth at least equal to the difference between the two rows. The recess channel of one row of blocks serves as a guide for sliding in the adjacent upper row in forming a wall of such blocks. U.S. Pat. No. 4,543,745, dated Oct. 1, 1985, to Malcolm Beck, details "Multiple Use Decorative Edging". The decorative edging includes an uneven vertical row of timbers attached to a length of metal sheet such that the metal sheet supports the timbers. The timbers act as a barrier or edging to earth contained within, such that the timbers also provide a decorative function. The edging so constructed may be connected end-to-end to itself or to other such edging units to form continuous shapes. "Landscape Edging" is detailed in U.S. Pat. No. 4,747,231, dated May 31, 1988, to Larry R. LeMay, et al. The landscape edging has multiple sections engaged adjacent to each other on a length of strip material, each length of strip material having two longitudinal edges, one of the longitudinal edges preferably having a cylindrically-shaped, bead-like projection. The strip engages in a similarly shaped slot cut through one end of each section, forming a length of landscape edging. U.S. Pat. No. 4,787,185, dated Nov. 29, 1988, to DeWayne Gasho, details "Log Structures and Method of Constructing Same". The log structures include an array of ripples machined into parallel top and bottom surfaces of each log. The ripples include peaks and valleys and the top ripple surface is aligned with valleys and peaks, respectively, in the lower ripple surface. Logs are stacked with the top ripple surface of a lower log interlocked with a bottom ripple surface of an upper log. First and second logs are notched so as to interlock with their axes intersecting at a predetermined angle and third and fourth logs are notched and interlocked at the structure corner with their axes also intersecting at the predetermined angle. A "Retaining Wall System" is detailed in U.S. Pat. No. 4,936,712, dated Jun. 26, 1990, to Michael N. Glickman. The retaining wall system includes multiple kidney-shaped units placed on top of each other, the units constructed with projections for interengaging one another in multiple, selected positions, so that the angle of face of the resulting wall to the vertical can be different at different heights. U.S. Pat. No. 4,976,063, dated Dec. 11, 1990, to William J. Young, details a "Lawn Edging System and Associated Edging Components". The lawn edging system and associated edging components provide selectively configured landscape borders which includes releasably joined edging components, each having a body defining first and second end portions and upper and lower surfaces. The body includes a base portion for supporting the component on a supporting surface and an upright portion extending substantially the length of the component. Furthermore, each second end portion of the body defines an indented section provided in the upper surface of the component body for releasably receiving the first end portion of another component. A "Composite Masonry Block" is detailed in U.S. Pat. No. 5,017,049, dated May 21, 1991, to Dick J. Siebert. The composite masonry block includes a substantially rectangular body having a bevelled surface and an interlocking flange. Also disclosed is structure made from the masonry block and methods of making the block. A "Decorative Lawn Edging Package" is detailed in U.S. Pat. No. 5,027,551, dated Jul. 2, 1991, to L. E. Rodriguez. The decorative lawn edging includes several units or segments that are continuously disposed and held together by a connecting corrugated band that is inserted on one of the ends of the units along their diameters. The band is sufficiently flexible to permit the units to follow a curved path without separation between the units.

It is an object of this invention to provide an articulating stone edging construction which includes stacked rows of ornamental stones connected in offset, articulating relationship, with hidden connecting elements.

Another object of the invention is to provide an articulating stone edging construction which includes stacked rows of ornamental stone connected in staggered relationship by hidden wires to facilitate articulation in substantially any desired configuration.

Yet another object of this invention is to provide an articulating stone edging construction which includes a bottom row of shaped ornamental stones, each fitted with spaced, transverse openings and a downwardly-extending anchor pin and a row of top stones stacked in staggered configuration on the bottom stones and fitted with spaced, downwardly-extending tie wires which are inserted through the respective openings in the bottom stones in offset relationship, wherein the tie wires are twisted around the anchor pins, respectively, to join the top stones to the bottom stones in articulating relationship.

Still another object of this invention is to provide an articulating stone edging construction which includes a bottom row of ornamental stones having rounded edges positioned in end-to-end relationship, each of the bottom stones provided with spaced, vertically transverse openings and selected bottom stones having a downwardly-extending anchor pin, and a row of top stones stacked on the bottom stones in staggered relationship, each of the top stones fitted with spaced, downwardly-extending tie wires which register with the corresponding openings provided in the bottom stones, wherein the tie wires may be twisted around the anchor pins, respectively, and the anchor pins inserted in the ground to join the top stones to the bottom stones in individually articulating relationship and secure the edging construction to the ground.

SUMMARY OF THE INVENTION

These and other objects of the invention are provided in a new and improved articulating stone edging construction for bordering flower beds, trees, shrubs, driveways, walkways and the like, which edging construction includes a bottom row of molded ornamental stones having rounded edges disposed in end-to-end relationship and each fitted with a pair of spaced, vertical openings and a centrally located, downwardly-extending anchor pin for engaging the ground. A top row of molded ornamental stones is seated in staggered, end-to-end relationship on the bottom stones and each top stone is fitted with a pair of spaced, downwardly-extending tie wires projecting through corresponding openings in the bottom stones in offset relationship, such that each of the top stones spans a pair of the bottom stones and the hidden tie wires may be twisted around the hidden anchor pins, respectively, to join the top stones to the bottom stones in articulating relationship.

BRIEF DESCRIPTION OF THE DRAWING

The invention will be better understood by reference to the accompanying drawing, wherein:

FIG. 1 is a perspective view of a preferred embodiment of the articulating stone edging construction of this invention in functional configuration bordering a flower bed;

FIG. 2 is an exploded view of three stacked ornamental stone elements of the articulating stone edging construction illustrated in FIG. 1, more particularly illustrating a preferred method of connecting the top and bottom stones;

FIG. 3 is a sectional view of the stacked ornamental stone elements illustrated in FIG. 2;

FIG. 4 is a sectional view of the ornamental stone elements illustrated in FIGS. 2 and 3 in engaged and partially assembled configuration;

FIG. 5 is a sectional view of the ornamental stone elements illustrated in FIGS. 2-4 in a preferred completely assembled configuration;

FIG. 6 is a sectional view of five ornamental stones assembled and positioned on the ground according to a preferred embodiment of the invention;

FIG. 7 is a sectional view of a typical bottom stone; and

FIG. 8 is an enlarged sectional view of an alternative preferred assembly for the ornamental stones in the articulating stone edging construction of this invention.

DESCRIPTION OF THE PREFERRED EMBODIMENTS

Referring initially to FIGS. 1-3 and 6 of the drawing, the articulated stone edging construction of this invention is generally illustrated by the stone edging 1. The stone edging 1 rests on the ground 16, borders a flower bed 17 and is characterized in a most preferred embodiment by multiple bottom stones 2, each having a rounded or flat bottom stone bottom face 5 and a bottom stone top face 3. The bottom stones 2 are arranged in end-to-end relationship with a narrow clearance between the bottom stone ends 4, as illustrated in FIG. 6. Each of the bottom stones 2 is further characterized by a pair of vertically transverse, spaced bottom stone openings 7 which extend through the entire width of the bottom stones 2, from the bottom stone top face 3 to the bottom stone bottom face 5. An anchor pin 6 is embedded in each of the bottom stones 2 at the approximate middle thereof and extends downwardly into the ground 16, for anchoring each of the bottom stones 2 on the ground 16. Similarly, multiple top stones 9, each having a rounded or flat top stone top face 10, top stone bottom face 12 and curved top stone ends 11, are arranged in end-to-end relationship on top of the bottom stones 2 in offset or staggered orientation, with small spaces between the top stone ends 11. A pair of tie wires 13 project downwardly from embedment in each of the top stones 9 in spaced relationship and register with the corresponding bottom stone openings 7 located in the bottom stones 2, as illustrated. Accordingly, each of the top stones 9 spans the ends of a corresponding pair of bottom stones 2 in offset, staggered, articulating relationship, as hereinafter further described. In a preferred embodiment of the invention the bottom projecting ends of the tie wires 13 are twisted around a corresponding anchor pin 6 of the matching bottom stone 2 to secure the row of top stones 9 on the bottom stones 2 in connected, articulating relationship, as illustrated in FIGS. 5 and 6. In a most preferred embodiment of the invention four of the top stones 9 are connected to four of the bottom stones 2 in the manner illustrated in FIGS. 5 and 6 and each segment of 8 stones is then connected to corresponding segments of 8 stones to complete a stone edging 1 of selected length. Since each of the top stones 9 is able to rotate to a limited degree about the tie wires 13 with respect to a corresponding bottom stone 2 to which it is connected and vice-versa, it will be appreciated that the stone edging 1 may be positioned in substantially any configuration, including a circle, an S-curve, a straight line or the like, as desired. This articulation is aided by the rounded bottom stone ends 4 and top stone ends 11 in the bottom stones 2 and top stones 9, respectively.

In another preferred embodiment of the invention a bottom stone cavity 14 is provided in each of the bottom stones 2, as illustrated in FIG. 8. This bottom stone cavity 14 surrounds each of the downwardly-projecting anchor pins 6 and is designed to receive the projecting ends of the tie wires 13 and conceal the twisted interface of the tie wires 13 with the anchor pins 6. In a most preferred embodiment of the invention an epoxy, concrete or other suitable cement cavity filling 15 is applied to the bottom stone cavity 14 to seal the twisted tie wires 13. Accordingly, the only visible projection from the respective bottom stone bottom faces 5 of the top stones 2 is the anchor pin 16.

Referring again to FIGS. 4 and 7 of the drawing, in yet another preferred embodiment of the invention, it will be appreciated that instead of twisting the tie wires 13 around the corresponding anchor pin 6 in each set of top stones 9 and bottom stones 2, the projecting ends of the tie wires 13 may be forced directly into the ground 16, along with the anchor pin 6, or in lieu of an anchor pin 6, as illustrated in FIG. 7, to anchor the stone, edging 1 to the ground 16. Alternatively, the anchor pin 6 may be eliminated in all or some of the bottom stones 2 as illustrated in FIG. 7, under circumstances where the tie wires 13 alone are used to anchor the stone edging 1.

It will be appreciated by those skilled in the art that the bottom stones 2 and top stones 9 of the stone edging 1 of this invention may be constructed of any desired size and shape from any desired material, according to the knowledge of those skilled in the art. However, in a preferred embodiment the bottom stones 2 and top stones 9 are molded from clay or other suitable material and the bottom stone ends 4 and top stone ends 11 are curved to facilitate articulation when the bottom stones 2 are connected to the top stones 9 as described above. Furthermore, a half stone 8 may be provided at the ends of the stone edging 1, as illustrated in phantom in FIG. 4 of the drawing, to complete the symmetry of the stone edging 1. As in the case of the remaining bottom stones 2, the half stone 8 is fitted with a transverse opening (not illustrated) to receive the corresponding tie wire 13, which can be inserted into the ground, bent against the bottom of the half stone 8 or cut off even with the bottom of the half stone 8, as desired. Articulation of the stone edging 1 is convenient, especially under circumstances where the stone edging 1 must assume a circular configuration where the circle is relatively small, such as around trees, shrubs and the like. Furthermore, the tie wires 13 and anchor pin 6 are not visible when the stone edging 1 is deployed in a functional configuration as illustrated in FIG. 1, thus presenting a decorative, as well as functional border for the flower bed 17.

While the preferred embodiments of the invention have been described above, it will be recognized and understood that various modifications may be made therein and the appended claims are intended to cover all such modifications which may fall within the spirit and scope of the invention.

Having described our invention with the particularity set forth above, what is claimed is:

1. An articulating stone edging construction comprising at least two bottom stones positioned in end-to-end relationship on a supporting surface; a pair of openings provided in spaced relationship from top to bottom in said bottom stones; an anchor pin carried by at least one of said bottom stones for engaging the supporting surface; at least one top stone spanning the facing ends of said bottom stones and positioned on top of said bottom stones; and a pair of tie wires carried by said top stone in spaced relationship, said tie wires projecting through said openings, respectively, and connected to said anchor pin, whereby said bottom stones and said top stone are connected in stacked articulating relationship.

2. The articulated stone edging construction of claim 1 wherein said at least two bottom stones further comprises a plurality of bottom stones and said at least one top stone further comprises a plurality of top stones secured to said bottom stones in staggered, articulated relationship.

3. The articulating stone edging construction of claim 2 further comprising anchor pins carried by selected ones of said bottom stones for anchoring said top stones and said bottom stones to the supporting surface.

4. The articulating stone edging construction of claim 3 wherein said tie wires are twisted around said anchor pins, respectively.

5. The articulating stone edging construction of claim 4 further comprising a cavity provided in the bottom of said bottom stones for receiving said tie wires and filling material added to said cavity for sealing said tie wires in contact with said anchor pins, respectively.

6. The articulating stone edging construction of claim 1 wherein said tie wires are joined together and twisted around said anchor pins, respectively.

7. The articulated stone edging construction of claim 6 wherein said at least two bottom stones further comprises a plurality of bottom stones and said at least one top stone further comprises a plurality of top stones secured to said bottom stones in staggered, articulated relationship.

8. An articulating stone edging construction for mounting on a supporting surface in edging configuration, comprising a plurality of bottom stones having rounded bottom stone ends positioned in end-to-end relationship on the supporting surface; a pair of spaced openings provided in vertically transverse relationship in each of said bottom stones; at least one anchor pin carried by selected ones of said bottom stones for engaging the supporting surface; a plurality of top stones having rounded top stone ends and positioned on said bottom stones in staggered relationship; and a pair of tie wires carried by each of said top stones in spaced relationship, said tie wires projecting through said openings, respectively, and twisted around said anchor pins, respectively, whereby said bottom stones are secured on the supporting surface and said bottom stones and said top stones are joined in stacked, articulating, staggered relationship.

9. The articulating stone edging configuration of claim 8 further comprising an anchor pin carried by each of said bottom stones.

10. The articulating stone edging configuration of claim 8 further comprising a cavity provided in the bottom of said selected ones of said bottom stones for receiving said tie wires and filling material added to said cavity for sealing said tie wires in contact with said anchor pin, respectively.

11. The articulating stone edging configuration of claim 8 further comprising an anchor pin carried by each of said bottom stones and a cavity provided in the bottom of said selected ones of said bottom stones around said anchor pin for receiving said tie wires and filling material added to said cavity for sealing said tie wires in contact with said anchor pin, respectively.

12. An articulating stone edging construction for disposition on the ground in edging configuration, comprising a plurality of bottom stones having rounded bottom stone ends positioned in end-to-end relationship on the ground; a pair of spaced openings provided in transverse, top-to-bottom relationship in each of said bottom stones; at least one anchor pin projecting from selected ones of said bottom stones for penetrating the ground; a plurality of top stones having rounded top stone ends and positioned on said bottom stones in staggered relationship; and a pair of tie wires carried by each of said top stones in spaced relationship, said tie wires projecting through said openings, respectively, and twisted around said anchor pins, respectively, whereby said bottom stones are secured to the ground and said bottom stones and said top stones are joined in stacked, articulating, staggered relationship.

13. The articulating stone edging construction of claim 12 wherein said at last one anchor pin further comprises a single anchor pin projecting from each of said selected ones of said bottom stones.

14. The articulating stone edging construction of claim 12 further comprising a cavity provided in the bottom of said selected ones of said bottom stones for receiving said tie wires and filling material added to said cavity for sealing said tie wires in contact with said anchor pin, respectively.

15. The articulating stone edging construction of claim 12 wherein said at least one anchor pin further comprises a single anchor pin projecting from each of said selected ones of said bottom stones and further comprising a cavity provided in the bottom of said selected ones of said bottom stones for receiving said tie wires and filling material added to said cavity for sealing said tie wires in contact with said anchor pin, respectively.

16. The articulating stone edging construction of claim 12 wherein said bottom stones and said top stones are characterized by flat top and bottom surfaces, respectively.

17. The articulating stone edging construction of claim 16 wherein said at least one anchor pin further comprises a single anchor pin projecting from each of said bottom stones between said tie wires.

18. The articulating stone edging construction of claim 17 further comprising a cavity provided in the bottom of said selected ones of said bottom stones for receiving said tie wires and filling material added to said cavity for sealing said tie wires in contact with said anchor pin, respectively.

* * * * *